Patented Mar. 20, 1923.

1,449,299

UNITED STATES PATENT OFFICE.

RALPH SANSEVERO, OF BROOKLYN, NEW YORK.

THERAPEUTIC COMPOSITION.

No Drawing.    Application filed March 1, 1922.    Serial No. 540,279.

*To all whom it may concern:*

Be it known that I, RALPH SANSEVERO, a subject of the King of Italy, and a resident of the city of New York, borough of Brooklyn, in the county of Kings and State of New York, have invented new and useful Improvements in Therapeutic Compositions, of which the following is a full, clear, and exact description.

This invention relates to a composition for the treatment of diseases, primarily for the treatment of venereal diseases.

The general object of this invention is the provision of a compound having bactericidal and penetrating properties for the treatment of disease by local applications.

A further object is the provision of a composition which upon application liberates a penetrating antiseptic agent.

Another object is the provision of a composition including a silver compound which does not have an extreme caustic effect even when a concentrated solution is used in the local application.

These objects are accomplished by providing a composition in which a colloidal silver is combined with a bile salt and hexamethylene tetramine.

These and other objects of the invention will be more clearly understood as the description proceeds.

In preparing novargol, first a bile acid and sodium hydroxide are mixed and then dissolved in water. A chemical action takes place and the result is a salt and water. If the bile acid used is glycocholic acid, the result is sodium glycocholate and water. After the bile salt has been formed a solution of hexamethylene tetramine is prepared to which a colloidal silver is added, then the latter solution is added to the bile salt and water, after which the water is evaporated at a low temperature, leaving a solid of a brown color. This solid is what the applicant calls novargol. In preparing it for use it is preferably ground and thus supplied in the form of a powder.

A particular composition may be made by mixing 76 parts of glycocholic acid, which is a bile acid, with 50 parts of sodium hydroxide, and dissolving the two in 1,000 parts of water, and then a chemical action takes place. The result is sodium glycocholate and water. To this is added a solution of hexamethylene tetramine including 40 parts of hexamethylene tetramine dissolved in 100 parts of water and containing 100 parts of a colloidal silver, preferably solargentum-Squibb. The water is then evaporated and the solid left is powdered.

A sodium glycocholate included in the composition, as described in the preceding paragraph, when applied in the treatment of disease becomes a penetrating agent and penetrates through the tissues. It is also a bactericidal and attacks disease germs. Further, in the penetrating process it carries along with it the colloidal silver, which in this particular case is solargentum-Squibb. A colloidal silver, as is well known, is very destructive to venereal disease germs. The hexamethylene tetramine combines with acids and liberates formaldehyde which is a penetrating agent and also bactericidal. Thus it will be seen that a composition has been prepared which has great bactericidal and penetrating powers yet which is not caustic in the extreme when applied.

Claims:

1. A therapeutic composition of the character described, consisting of a bile salt, a colloidal silver and hexamethylene tetramine.

2. A therapeutic composition of the class described comprising sodium glycocholate, solargentum-Squibb and hexamethylene tetramine.

3. A composition of the class described consisting of solargentum-Squibb sodium glycocholate and a formaldehyde liberating preparation.

RALPH SANSEVERO.